June 28, 1966  B. A. RUNDE ETAL  3,257,860

VIBRATION AND SHOCK INSULATING SPROCKET

Filed June 1, 1964

INVENTORS
BYRON A. RUNDE.
EDWARD BOYER.
BY
*Wallace P. Lamb*
ATTORNEY.

3,257,860
VIBRATION AND SHOCK INSULATING
SPROCKET
Byron A. Runde, Farmington, and Edward Boyer,
Detroit, Mich., assignors to Burroughs Corporation, Detroit, Mich., a corporation of Michigan
Filed June 1, 1964, Ser. No. 371,522
6 Claims. (Cl. 74—243)

This invention relates generally to chain driven mechanism and particularly to a sprocket therefor.

In drive mechanism wherein a motor drives a shaft through a chain and sprocket connection, two accompanying objections occur particularly where such mechanism is operated at high speeds. One of these objections is noise or audible vibrations which originate at the drive motor and at the metal to metal contact between the chain and sprocket. This noise is particularly objectionable where such mechanism is used to drive business machines located in offices. The other objection arises from a requirement for sudden and frequent stopping of the drive mechanism resulting in a high breakage of driven shafts by the inertia of the load on the shaft.

Accordingly it is an object of the invention to provide an improved compositely constructed chain sprocket to suppress audible vibrations originating in the drive and between the chain and the sprocket.

Another object of the invention is to provide an improved sprocket of composite construction in which the audible vibration suppressor also functions to cushion the shocks resulting from sudden starting and stopping of the drive mechanism.

Other objects of the invention will become apparent from the following detail description, taken in connection with the accompanying drawing in which.

Figure 1:
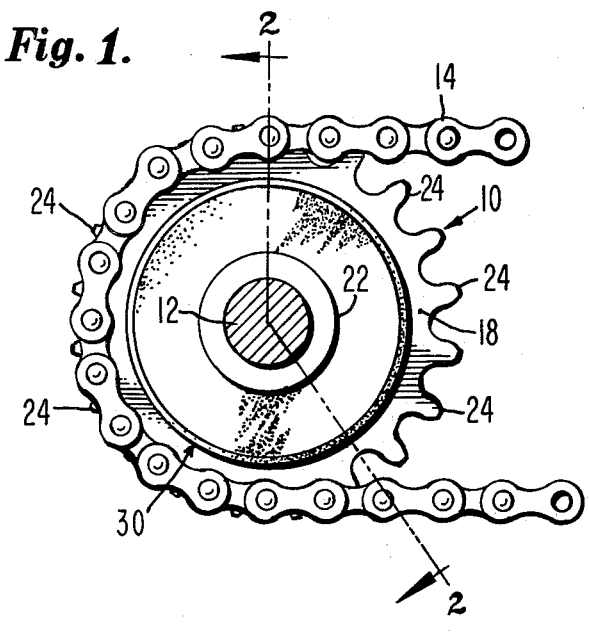
FIG. 1 is a side view of a chain driven sprockets embodying features of the invention.
Figure 2:
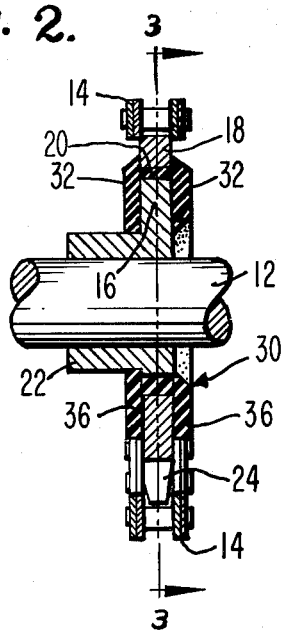
FIG. 2 is a sectional view, taken along the line 2—2 of FIG. 1.

Referring to the drawing by characters of reference, the sprocket, designated generally by the numeral 10, is shown affixed to a driven shaft 12 and is driven by an endless chain 14 from a power source, such as an electric motor (not shown).

Figure 3:
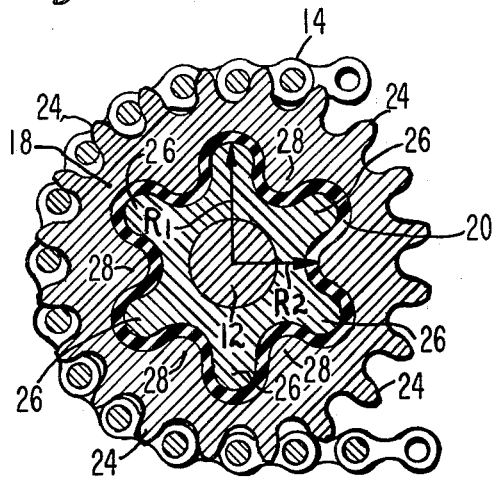
FIG. 3 is a section view, taken along the line 3—3 of FIG. 1.
Figure 4:
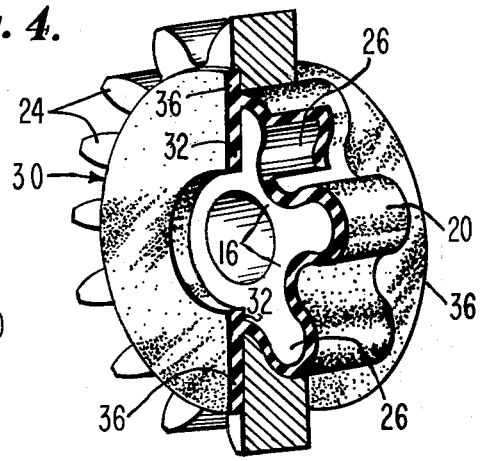
FIG. 4 is a perspective view of the sprocket with parts broken away and in section.

In order to suppress audible vibrations and cushion the shock resulting from a sudden stopping of the drive mechanism, the sprocket 10 is a composite structure having a web including an inner metal web portion 16, an outer metal web portion 18, and an intermediate rubberized web portion 20 which functions as a connector, audible vibration suppressor and shock cushion. The inner metal web portion 16 is integral with a sprocket hub 22 and extends around the hub transversely to the hub axis. The outer metal web portion 18 extends around the inner metal web portion 16 substantially coplanar therewith, and integral sprocket teeth 24 are provided and are angularly spaced about the web outer periphery, as shown. The sprocket metal web portions 16 and 18 have their inner edges in opposed spaced apart relationship and these edges are scalloped or sinuous, as viewed in FIG. 3. The scalloped edge of the inner web portion 16 provides it with a number of outwardly directed angularly spaced extended members 26, the tips of which are shown displaced a radial distance $R_1$ from the axial center of the wheel, and similarly, the scalloped edge of the outer metal web portion 18 provides it with a like number of inwardly directed angularly spaced extended members 28, the tips of which are shown displaced a lesser radial distance $R_2$ from the axial center of the wheel. The number of scalloped portions on the inner and outer web portions is unrelated to the number of sprocket teeth 24 on the outer web portion. The outwardly directed extended members 26 position between the inwardly directed extended members 28 with the scalloped configurations of the opposed edge surfaces being substantially complementary to or conforming mutually in contour, the depth of the scallops of the web portions 16 and 18 being substantially equal. Stated in different terms the differential distance between $R_1$ and $R_2$ is nearly equal to the radial extent of the members 26 or 28. The opposed scalloped contours are spaced apart and insulated by the web portion 20 of the vibration suppressor and shock cushion, designated generally by the numeral 30. The web 20 is common to two channel members of which one has inwardly directed side flanges 32 and the other has outwardly directed side flanges 36. The noise suppressor and shock cushion 30 may also be described as comprising a pair of spaced apart parallel annuli joined together by an endless web extending in a sinuous path around the common axis of the annuli and within the confines of the inner and outer peripheries of the annuli. The extended members 26 of the inner metal web are received in the inner channel of the noise suppressor and shock cushion 30 and the extended members 28 are received in the outer channel of the noise suppressor and shock cushion.

The noise suppressor and shock cushion 30 may be made of any suitable material which is both resilient and durable, such as an elastomeric resinous material. Preferably the elastomeric resinous material used is black urethane rubber having a durometer rating of 65 to 70. In joining the two metal sprocket parts together, a mold is designed to receive and hold the parts in concentric spaced apart relationship and the rubber is injected into the mold, filling the spaces between the interfitting extended members 26 and 28 of the metal webs and filling the spaces provided for forming the flanges, or annuli of the part. Any of the well known bonding processes may be used to bond the metal parts of the sprocket to the molded rubber. In the present sprocket construction where black urethane rubber is used, I prefer to effect the bonding and vulcanization with the use of a rubber cement, such as Thixon P–4. As a consequence of the molding operation, the rubber is bonded to the metal parts to form a composite unit which will have no appreciable relative movement of the metal sprocket parts at constant load driving speed. However, on acceleration and/or on sudden deceleration of the sprocket, limited relative rotation between the metal sprocket parts is permitted by displacement of the rubber, thus cushioning inertia shocks and avoiding shaft breakage. By convexly rounding the ends of the extended members 26 and 28 such that their collective surface areas are equal to about one-half the total sinuous area of the noise suppressor and shock absorber 30, no appreciable shear force is experienced on acceleration and/or on deceleration of the sprocket, but instead the rubber is in compression and tension. The rubber web 20 also functions as an insulator to suppress audible vibrations, and suppression of such vibrations is supplemented by making the rubber side flanges 32, 36 thicker than the rubber web 20 and extending them substantially to the sprocket teeth 24. The thickness of the rubber web 20 is preferably about .047 of an inch and the thickness of each of the flanges 32 and 36 is about .06 of an inch for optimum noise suppression results.

While we have shown and described our sprocket construction in considerable detail, it will be understood that many changes and variations may be made therein without departing from the spirit and scope of the invention.

We claim:

1. A shock absorbing and audible vibration suppressing sprocket comprising an inner metal web portion having a sinuous outer periphery in a plane transverse to the axis of rotation of said metal web portion, an outer metal web portion surrounding said inner metal web portion in substantially coplanar relation therewith and having an inner sinuous periphery in said plane, said peripheries being in spaced apart relationship, a resilient rubberized web separating and bonded to said peripheries and having side flanges bonded to opposite sides of said web portions.

2. A shock absorbing and audible vibration suppressing sprocket comprising an inner metal web portion having a sinuous outer periphery in a plane transverse to the axis of rotation of said web portion, an outer metal web portion surrounding said inner metal web portion in substantially coplanar relation therewith and having an inner periphery in said plane, said sinuous peripheries complementary and spaced apart, and a resilient rubberized channel structure having a web between and conforming to said sinuous peripheries and having a pair of oppositely directed flanges respectively bonded to the sides of said inner and outer web portions.

3. A shock absorbing and audible vibration suppressing sprocket comprising an inner metal web portion having a sinuous outer periphery in a plane transverse to the axis of rotation of said web portion, an outer metal web portion surrounding said inner metal web portion in substantially coplanar relation therewith and having an inner periphery in said plane, said sinuous peripheries complementary and spaced apart, and a resilient rubberized channel structure having a web between and conforming to said sinuous peripheries and having a pair of oppositely directed flanges respectively bonded to the sides of said inner and outer metal web portions, the thickness of each said flanges being greater than the thickness of said web.

4. A shock absorbing and audible vibration suppressing sprocket comprising an inner metal web portion having a scalloped outer periphery in a plane transverse to the axis of rotation of said web portion, an outer metal web portion surrounding said inner metal web portion and having a scalloped inner periphery in said plane, the scalloped peripheries of said inner and outer web portions being in opposed spaced apart complementary relationship, a resilient rubberized web between and bonded to said scalloped peripheries, a pair of oppositely disposed rubberized flanges integral with said web and bonded to opposite sides of said inner metal web portion, a second pair of oppositely disposed rubberized flanges integral with said web and bonded to opposite sides of said outer metal web portion, each said flanges having a thickness greater than the thickness of said web and said web and flanges having a durometer rating 65 to 70.

5. A shock absorbing and audible vibration suppressing sprocket comprising an inner metal web portion having a scalloped outer periphery in a plane transverse to the axis of rotation of said web portion, an outer metal web portion surrounding said inner metal web portion and having a toothed outer periphery and a scalloped inner periphery in said plane, the scalloped peripheries of said inner and outer web portions being in opposed spaced apart complementary relationship, a resilient rubberized web between and bonded to said scalloped peripheries, the outwardly extending crests of the scalloped inner web portion being displaced radially from the axial center of the sprocket a distance which is greater than the radial displacement of the inwardly extending crests of the outer web portion intercollated between the scallops of the inner web portion, a pair of oppositely disposed rubberized flanges integral with said web and bonded to opposite sides of said inner metal web portion, a second pair of oppositely disposed rubberized flanges integral with said web and bonded to opposite sides of said outer metal web portion, each said flanges having a thickness greater than the thickness of said web.

6. A shock absorbing and audible vibration suppressing sprocket comprising an inner metal web portion having a scalloped outer periphery in a plane transverse to the axis of rotation of said web portion, an outer metal web portion surrounding said inner metal web portion and having a toothed outer periphery and a scalloped inner periphery in said plane, the scalloped peripheries of said inner and outer web portions being in opposed spaced apart complementary relationship, a resilient rubberized web between and bonded to said scalloped peripheries, the outwardly extending crests of the scalloped inner web portion being displaced radially from the axial center of the sprocket a distance which is greater than the radial displacement of the inwardly extending crests of the outer web portion intercollated between the scallops of the inner web portion, a pair of oppositely disposed rubberized flanges integral with said web and bonded to opposite sides of said inner metal web portion, a second pair of oppositely disposed rubberized flanges integral with said web and bonded to opposite sides of said outer metal web portion, each said flanges having a thickness greater than the thickness of said web, and said web and flanges having a durometer rating of 65 to 70.

References Cited by the Examiner

UNITED STATES PATENTS

| | | | |
|---|---|---|---|
| 288,134 | 11/1883 | Stone | 64—27 X |
| 1,060,865 | 5/1913 | Sundh | 64—27 X |
| 1,928,763 | 10/1933 | Rosenberg | 64—27 |
| 2,560,644 | 7/1951 | Hartzell | 64—27 X |

FOREIGN PATENTS

| | | |
|---|---|---|
| 682,196 | 11/1952 | Great Britain. |
| 759,215 | 10/1956 | Great Britain. |

DAVID J. WILLIAMOWSKY, *Primary Examiner.*

DON A. WAITE, *Examiner.*

J. A. WONG, *Assistant Examiner.*